United States Patent [19]

Yamada

[11] 4,243,001
[45] Jan. 6, 1981

[54] INDUCTION SYSTEM FOR MULTI-CYLINDER ENGINE

[75] Inventor: Minoru Yamada, Iwata, Japan

[73] Assignee: Yamaha Hatsukoki Kabushiki Kaisha, Iwata, Japan

[21] Appl. No.: 10,930

[22] Filed: Feb. 9, 1979

[30] Foreign Application Priority Data

Feb. 10, 1978 [JP] Japan .................................. 53/14523

[51] Int. Cl.³ .............................................. F02N 17/00
[52] U.S. Cl. .................. 123/583; 261/23 A; 123/432; 123/442
[58] Field of Search ........... 123/122 A, 122 AA, 127, 123/32 ST, 32 SP, 75 B; 261/23 A, 23 R

[56] References Cited

U.S. PATENT DOCUMENTS

| | | | |
|---|---|---|---|
| 2,647,502 | 8/1953 | Braun | 261/23 A |
| 3,252,539 | 5/1966 | Ott | 261/23 A |
| 3,319,942 | 5/1967 | Mennesson | 261/23 A |
| 3,330,542 | 7/1967 | Taylor | 261/23 A |
| 3,543,736 | 12/1970 | Suzuki | 123/32 ST |
| 4,018,199 | 4/1977 | Furucz | 123/127 |
| 4,064,850 | 12/1977 | Wakagawa | 123/75 B |
| 4,144,861 | 3/1979 | Yamashita | 261/23 A |

*Primary Examiner*—Ronald H. Lazarus
*Attorney, Agent, or Firm*—Ernest A. Beutler

[57] ABSTRACT

An induction system for a multi-cylinder internal combustion engine that improves fuel efficiency and reduces the emission of unwanted exhaust gas constituents, particularly at the low and medium load conditions. The engine induction system comprises a plurality of separate carburetor barrels which, at least under some running conditions, serve cylinders separately from each other through main induction passages. One carburetor barrel is provided with a different fuel discharge system than the other carburetor barrels for accommodating a certain engine operating condition. A separate sub-intake system connects this carburetor barrel with other cylinders not normally served by the particular carburetor barrel in question. This sub-intake system has a substantially smaller cross-sectional area in the main intake system so that the charge drawn into the cylinders through the sub-intake system enters at a substantially higher velocity. This improves combustion by creating turbulence under at least some operating conditions. In a specific illustrated embodiment, the one carburetor barrel is provided with a choke valve so as to provide cold starting enrichment for all of the cylinders served by this carburetor barrel during cold starting. In accordance with the invention, means are provided for achieving a corresponding flow resistance in the carburetor barrels which do not have the cold starting device so that under other engine operating conditions the flow resistance between the various carburetor barrels is equal. In one embodiment this is done by providing a somewhat smaller venturi section in the other carburetor barrels. In another embodiment, this is done by changing the initial setting of the throttle valve of the one carburetor barrel from the others so as to provide the appropriate resistance differential.

10 Claims, 3 Drawing Figures

4,243,001

INDUCTION SYSTEM FOR MULTI-CYLINDER ENGINE

BACKGROUND OF THE INVENTION

This invention relates to an induction system for a multi-cylinder engine having multiple carburetor barrels and more particularly to such an induction system that offers more balanced operation between the individual cylinders and improved combustion and efficiency throughout the entire engine range.

Recently it has been discovered that engine operation (both emission of unwanted exhaust gas constituents and fuel economy) can be improved, particularly at idle and low load operation by providing a sub-intake system through which a substantial portion of the induction charge flows to the combustion chambers under these operating conditions. By using a relatively small cross-sectional area induction system turbulence and, if desired, swirl may be generated in the combustion chamber at the time of ignition. As such, smoother and more efficient combustion results under these load conditions.

It has been proposed to control the flow through the sub-intake system by means of a main throttle valve and an auxiliary or sub-throttle valve which operate in sequence so as to cause substantially all of the idle and low load charge requirements to enter the combustion chambers through the sub-intake passage and to provide an increased flow through the main induction passage as the engine load increases. In connection with the adaptation of this concept to multiple chamber engines having multiple carburetor barrels, it has been proposed to provide only one of the carburetor barrels with a system for accommodating certain engine operating conditions. This one carburetor barrel can serve a plurality of chambers through the combined sub-intake passages, all of which are fed from this one carburetor barrel. An example of an application of this principal to a multiple cylinder engine may be found in the copending application of Hiromitsu Matsumoto, Ser. No. 838,353, entitled Control of Carburetor Supplied Induction System, filed Sept. 30, 1977 and assigned to the assignee of this application, such an arrangement being shown specifically in the embodiment of FIGS. 6–10 of that application. In that embodiment only one of the carburetor barrels is provided with a cold starting device in the form of a choke valve. This barrel serves other chambers in addition to the normally served by it during cold starting via an interconnected sub-intake system.

In accordance with an arrangement whereby multiple carburetors are used and one of these carburetors provides functions not provided by the other carburetors, uneven operation between the chambers may result under conditions other than that served by the single carburetor barrel. For instance, the use of a choke valve in only one carburetor barrel causes that carburetor barrel to have a greater flow resistance than the other carburetor barrels during unchoked operation. Thus, uneven mixture distribution and combustion may occur between the respective chambers.

It is, therefore, a principal object of this invention to provide an improved induction system for insuring even combustion between the respective chambers of a multi-chamber engine.

It is another object of the invention to provide an induction system for a multiple carburetor engine that improves efficiency without sacrificing even operation throughout the engine load and speed range.

SUMMARY OF THE INVENTION

This invention is adapted to be embodied in an internal combustion engine having a plurality of variable volume chambers in which combustion occurs and a plurality of main intake passage each communicating with a respective chamber through a respective main intake port for delivering a charge to the respective chamber. A plurality of carburetor barrels are also provided each of which serves at least one respective chamber through its respective main intake passage. Certain of the carburetor barrels are out of communication with the respective main intake passages of certain other of the chambers. At least one of the carburetor barrels is provided with a specific system for discharging from the one carburetor barrel a mixture particularly adapted for a specific condition of engine operation. At least one of the other carburetor barrels is devoid of such a specific system. Means communicate the one carburetor barrel with a chamber served by another carburetor barrel for delivering the specific mixture of the specific system of the one carburetor barrel to both the one chamber and to the other chamber. The specific system of the one barrel provides a different resistance to flow for that one carburetor barrel than had the one carburetor barrel not had that specific system. In connection with this invention, means are provided for achieving a flow resistance in the other carburetor barrel equal to that generated by the specific system of the one carburetor barrel for equalizing flow conditions between respective chambers when being served individually by the respective carburetor barrels.

DETAILED DESCRIPTION OF THE PREFERRED EMBODIMENTS

This invention is adapted to be embodied in a multiple cylinder engine having a plurality of carburetors or carburetor barrels. An induction system consisting of main and sub-intake passages connects the carburetor barrels with respective cylinders. As disclosed in the aforenoted embodiment of copending application Ser. No. 838,353, one carburetor barrel serves a plurality of cylinders through the sub-intake passages during a certain opening condition. In the illustrated embodiment, only two carburetor barrels and their association with two adjacent cylinders of the engine have been shown. It is to be understood that the invention may be used with any number of cylinders, two or greater, and with any number of carburetor barrels. In addition, one carburetor barrel may serve all of the cylinders of an engine for a given operating condition or, alternatively, the one carburetor barrel may serve any number of cylinders less than the total number for a given engine.

Figure 1:
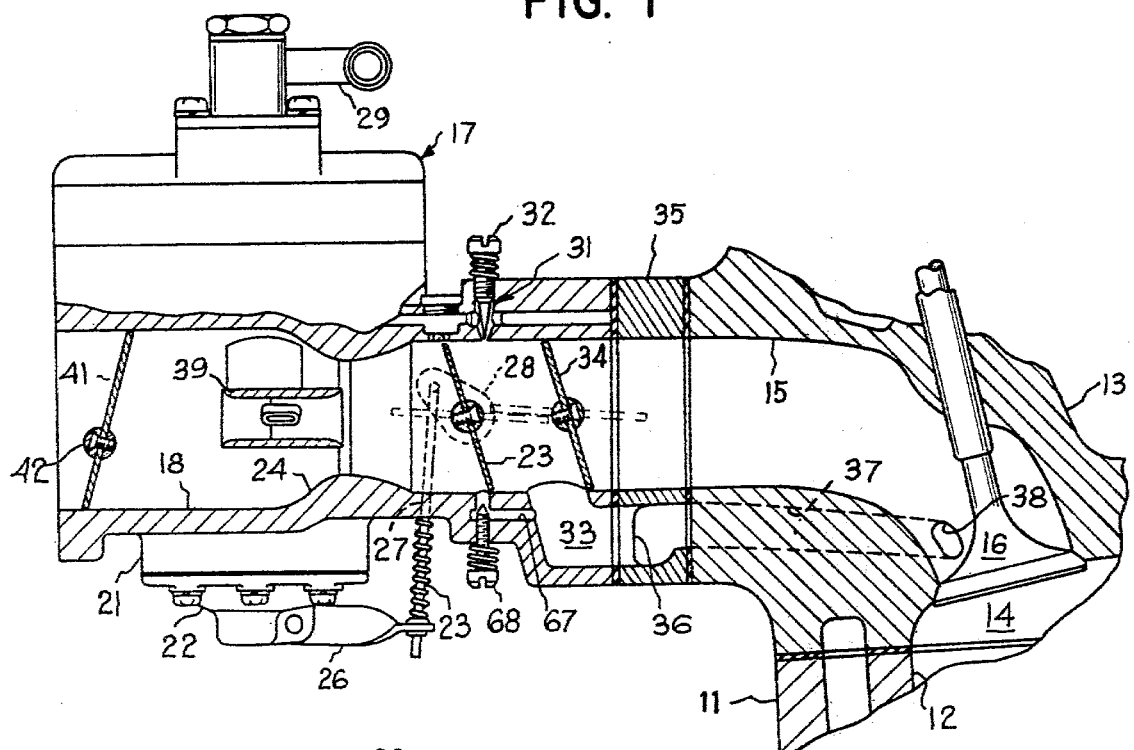
FIG. 1 is a longitudinal sectional view taken through one cylinder of a multi-cylinder engine and specifically the cylinder served by the main carburetor barrel embodying the invention.

Referring now specifically to the drawings and considering first FIG. 1, an engine constructed in accordance with this engine has a cylinder block 11 that is provided with a plurality of cylinder bores 12, only one of which appears in the drawing. Pistons (not shown) are supported for reciprocation in the cylinder bores 12 in a known manner. A cylinder head 13 is affixed to the cylinder block 11 and defines with the cylinder bores 12 and respective pistons, a plurality of combustion chambers 14. For each combustion chamber 14, a main intake passage 15 extends through the cylinder head 13 and the communication of the main intake passage 15 with the respective combustion chamber 14 is controlled in a known manner by an intake valve 16.

A two-barrel carburetor 17 is affixed to the cylinder head 13 for each adjacent pair of combustion chambers 14. The carburetor 17 includes a main barrel 18 and a secondary barrel 19 which serve respective, adjacent intake passages 15. The carburetor barrels 18 and 19 are served by a common float chamber 21 and accelerating pump 22.

A main throttle valve 23 is positioned in the main carburetor barrel 18 downstream of its respective venturi section 24. The main throttle valve 23 is supported in the carburetor body upon a throttle valve shaft 25. The accelerating pump 22 includes an accelerating pump lever 26 that is actuated by means of a link 27 that is connected to a lever 28 affixed to the throttle valve shaft 25 in a known manner.

Fuel is supplied to the float chamber 21 in a known manner by means including an inlet fitting 29.

The carburetor barrel 18 and only this barrel of the carburetor 17 is provided with an idle and low speed fuel discharge circuit, indicated generally by the reference numeral 31, having an adjusting needle 32. Idle and low speed fuel requirements for the two cylinders served by the carburetor 17 is all supplied by the carburetor barrel 18 via a supplemental or sub-intake system now to be described.

The sub-intake system includes an inlet passage 33 formed in the carburetor barrel 18 downstream of the main throttle valve 23 and upstream of a sub-throttle valve 34 that is also positioned in this carburetor barrel. A spacer plate 35, which is positioned between the carburetor 17 and the cylinder head 13 and which may be formed from a heat insulating material is formed with a sub-intake passage 36 that receives a charge from the carburetor sub-intake inlet passage 33 and which branches to cylinder head sub-intake passages 37 serving two adjacent combustion chambers 14. The cylinder head intake passages 37 each terminate in respective sub-intake ports 38 that are juxtaposed to the intake valve 16. The sub-intake passages 37 are of substantially less cross-sectional area than the main intake passages 15 so that a given mass flow through these passages will enter the chambers 14 at a substantially higher velocity. If desired, the sub-intakes passages 37 and ports 38 may be directed so as to also impart a swirl to the intake charge.

In addition to the idle and low speed circuit 31, the carburetor barrel 18 is provided with a main fuel discharge, including a boost nozzle 39. A similar main fuel discharge is also provided in the carburetor barrel 19 which serves the chamber adjacent the chamber 14 shown in FIG. 1.

A choke valve 41 is rotatably supported upon a shaft 42 in only the carburetor barrel 18 upstream of the venturi 24 and boost nozzle 39. As is known, the choke valve 41 provides cold starting enrichment and, as will become apparent, the cold starting enrichment serves all of the chambers fed by the sub-intake passages 33, 36 and 37. Thus, only one carburetor barrel need be provided with a cold starting enrichment device as described in the aforenoted copending application Ser. No. 838,353.

Figure 3:
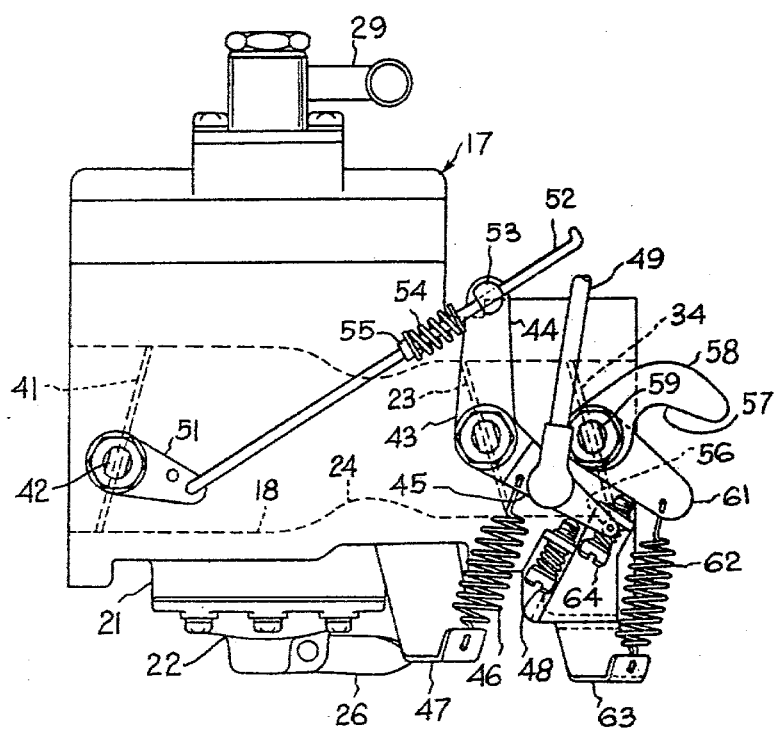
FIG. 3 is a side elevational view of the carburetor shown in FIG. 2.

The linkage system for controlling the operation of the main throttle valve 23 and the sub-throttle valve 34 will now be described by particular reference to FIG. 3. A bellcrank 43 is affixed to the throttle valve shaft 25 and has arms 44 and 45. A throttle return spring 46 is interconnected between the arms 45 and a bracket 47 affixed to the carburetor body for returning the throttle valve 23 to its idle position. This idle position is determined by an adjustable screw stop 48 that is juxtaposed to the outer end of the bellcrank arm 45. An operator controlled accelerator link 49 is also affixed to the bellcrank arm 45 for actuating the throttle valve 23 in a known manner.

The choke valve 41 may be operated either manually or automatically and the actuating structure for it is not illustrated since any conventional structure may be used. An unloader mechanism is, however, illustrated which is comprised of a lever 51 that is affixed to the choke shaft 42 and which is pivotally connected to an extending link 52. The link 52 passes with a clearance through a pin 53 that is carried by the arm 44 of the throttle valve shaft bellcrank 43. A spring 54 is interposed between the pin 53 and a shoulder that is stacked to the link 52. As is well known, the unloader mechanism will permit positioning of the choke valve 41 in the desired position without interfering with the operation of the throttle valve 23. However, full opening of the throttle valve 23 will cause the pin 53 to engage the spring 54 and act upon the link 52 to partially open the choke valve 41.

The sub-throttle valve 34 is controlled in sequence with the main throttle valve 23 so that the sub-throttle valve 34 will be progressively opened and to cause a larger portion of the mixture flowing into the chambers 14 to flow through the main intake passages 15 as the primary throttle valve 23 moves to its fully opened position. The mechanism for achieving this result comprises a pin 56 that is carried at the end of the bellcrank arm 43 and which is adapted to engage a cam surface 57 formed on one arm 58 of a bellcrank that is affixed to the sub-throttle shaft 59. The bellcrank has a second arm 61 to which one end of a tension spring 62 is affixed. The opposite end of the tension spring 62 is connected to a bracket 63 that is fixed to the carburetor body so as to urge the arm 61 into engagement with an adjustable stop 64.

A throttle valve 65 is positioned in the carburetor barrel 19 downstream of its venturi section 66 for controlling the flow through the carburetor barrel 19. The throttle valve 65 is affixed to the shaft 59 so that it will be operated simultaneously with the sub-throttle valve 34. The shaft 59 may extend to other carburetor throttle valves (not shown) which serve the same purpose as the throttle valve 65 in the carburetor barrel 19.

FIG. 1 illustrates the throttle valves 23, 34 and 65 in their normal idling positions. In this position the sub-throttle valve 34 and the throttle valve 65 of the carburetor barrel 19 are fully closed. The throttle valve 23 is set at its idling position and the fuel air mixture dispersed by the idle discharge circuit 31 flows into the sub-intake inlet passage 33. The idling charge is then delivered to the respective chambers 14 through the spacer passage 36 and cylinder head sub-intake passages 37. Due to the relatively small size of the sub-intake passages 37, a high velocity is imparted to the idle mixture which significantly increases the turbulence in the chamber 14 at the time of ignition and thus speeds flame propagation and improves combustion and efficiency. The idle mixture may also be adjusted by controlling the rate of flow through a bypass passage 67 formed in the carburetor body past the main throttle valve 23. An adjustment screw 68 controls the flow through the passage 67.

As the throttle valve 23 is progressively opened, the pin 56 will eventually contact the cam surface 57 of the lever 58 affixed to the sub-throttle valve shaft 59. Up until this time, all of the fuel air mixture for the chambers 14 will be supplied through the sub-intake passages 33, 36 and 37. During this phase of the engine operation, the carburetor barrel 18 will be serving all of the chambers 14 and the carburetor barrel 19 will be inactive.

In a preferred embodiment of the invention, the sub-throttle valve 34 and throttle valve 65 are initially opened when the engine is operating at about one-third of its rated output. The rate of opening of the sub-throttle valve 34 and throttle valve 65 in relation to further opening of the primary throttle valve 23 will depend upon the contour of the cam surface 57.

It should be apparent that as the engine load increases a larger proportion of the mixture will be gradually supplied by the carburetor barrels 19 to their respective chambers and past the open sub-throttle valve 34 to the chamber served by the main intake passage 15. Said another way, each individual carburetor barrel 18 or 19 will begin to supply its respective combustion chamber 14 at the higher load ranges of the engine.

As has been noted, only the carburetor barrel 18 is provided with a choke valve 41. Even though the choke valve 41 is in its fully opened position, the carburetor barrel 18 will have a slightly greater resistance to flow than will the unchoked barrel 19. This can result in uneven mixture delivery to the cylinders served by these barrels if not compensated for.

Figure 2:
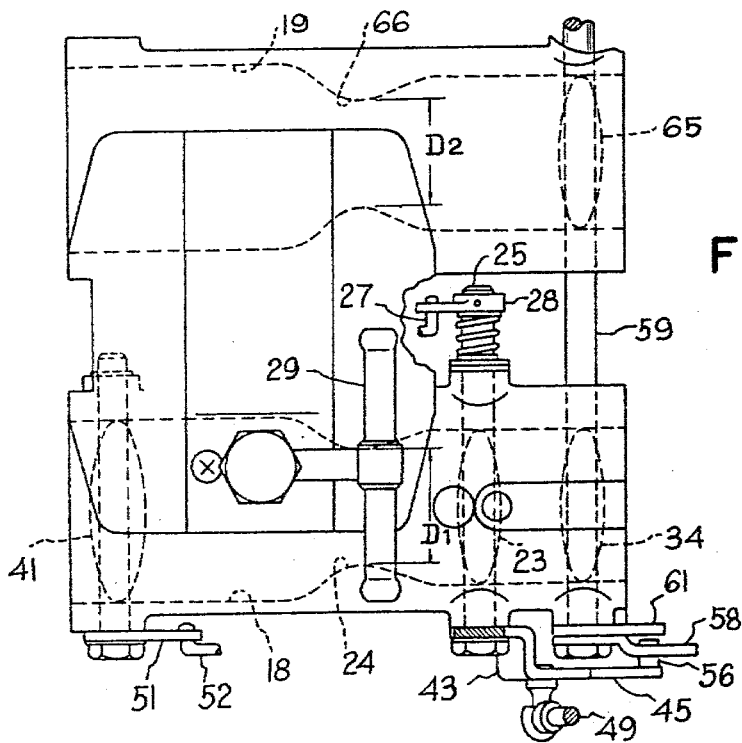
FIG. 2 is a top plan view of one two-barrel carburetor of the induction system constructed in accordance with the invention.

In accordance with one embodiment of the invention, the diameter of the primary barrel venturi 24, indicated by the dimension $D_1$ in FIG. 2 is chosen so as to be slightly larger than the corresponding diameter of the secondary barrel venturi 66, indicated by the dimension $D_2$. The difference in cross-sectional area is chosen so that the total flow resistance through the secondary barrel 19 will be the same as that through the primary barrel 18 when the choke valve 41 is fully opened.

The same effect may be achieved in another embodiment of the invention by offsetting the throttle valve 65 of the secondary barrel 19 relative to the sub-throttle valve 34 of the primary barrel 18. That is, the throttle valve 65 may be positioned on the shaft 59 in such a way that it will not be fully opened at the time the sub-throttle valve 34 is fully opened.

Although two methods for achieving the same flow resistance through the primary barrel 18 as through the secondary barrel 19 have been disclosed, it is to be understood that other structures for achieving this result may be obtained or the described methods may be used in combination.

It is to be understood that the foregoing description is that of preferred embodiments of the invention and that various changes and modifications may be made without departing from the spirit and scope of the invention as defined by the appended claims.

I claim:

1. In an internal combustion engine having a first variable volume chamber in which combuation occurs, a second variable volume chamber in which combination occurs, a first carburetor barrel, a first main intake passage interconnecting said first carburetor barrel with said first variable volume chamber and not with said second variable volume chamber, a second carburetor barrel, a second main intake passage interconnecting said second carburetor barrel with said second variable volume chamber and not with said first variable volume chamber, said first carburetor barrel being provided with a specific system for discharging a mixture particularly adapted for a certain condition of engine operation, said second carburetor barrel being devoid of such a specific system, and induction means for communicating said first carburetor barrel with said second variable volume chamber for supplying the particular mixture to said second variable volume chamber, said specific system being effective to increase the flow resistance through said first carburetor barrel from that which said first carburetor barrel would have if said first carburetor barrel was devoid of said specific system, the improvement comprising means providing a flow resistance in said second carburetor barrel equal to the flow resistance generated by said specific system in said first carburetor barrel for equalizing the flow through said first and said second main induction passages when the engine is operating at a condition other than the particular condition served by said specific system to provide uniform mixture to said first and said second chambers.

2. An internal combustion engine as set forth in claim 1 wherein the first carburetor barrel communicates with second chamber by means of an auxiliary induction passage, said first carburetor barrel communicating with the first chamber under the condition served by said specific system through an auxiliary intake passage.

3. An internal combustion engine as set forth in claim 2 wherein throttle valve means control the ratio of communication of the first carburetor barrel with the auxiliary intake passages and with the first main intake passage.

4. An internal combustion engine as set forth in claim 3 wherein the throttle valve means comprises a main throttle valve for controlling the flow through the first main intake passage and an auxiliary throttle valve for controlling the flow through the auxiliary intake passage.

5. An internal combustion engine as set forth in claim 4 wherein the second carburetor barrel is provided with a throttle valve controlling the flow through the second main intake passage, said throttle valve of said second carburetor barrel being connected for operation with the auxiliary throttle valve of the first carburetor barrel.

6. An internal combustion engine as set forth in claim 1, 2 or 3 wherein the specific system comprises a cold starting enrichment device.

7. An internal combustion engine as set forth in claim 1, 2 or 3 wherein the specific system comprises a choke valve for providing cold starting enrichment.

8. An internal combustion engine as set forth in claim 1, 3 or 5, wherein the flow restriction of the second carubretor barrel is provided by making its venturi section of a smaller diameter than the venturi section of the first carburetor barrel.

9. An internal combustion engine as set forth in claim 1, 3 or 5 wherein the flow restriction of the second carburetor barrel is provided by an adjustably positioned valve for restricting the flow through said second carburetor barrel.

10. An internal combustion engine as set forth in claim 5 wherein the means for providing the flow restriction in the second carburetor barrel comprises means for retarding the degree of opening of the throttle valve in said second carburetor barrel relatively to the auxiliary throttle valve in the first carburetor barrel.

* * * * *